Jan. 24, 1961

K. H. WILSON 2,969,245

DEVICE FOR TRANSPORTING AND STORING
ARTICLES OF FURNITURE AND THE LIKE

Filed March 23, 1959

INVENTOR.
KERMIT H. WILSON
BY
Merchant & Merchant
ATTORNEYS

Jan. 24, 1961　　　K. H. WILSON　　　2,969,245
DEVICE FOR TRANSPORTING AND STORING
ARTICLES OF FURNITURE AND THE LIKE
Filed March 23, 1959　　　　　　　　　　2 Sheets-Sheet 2
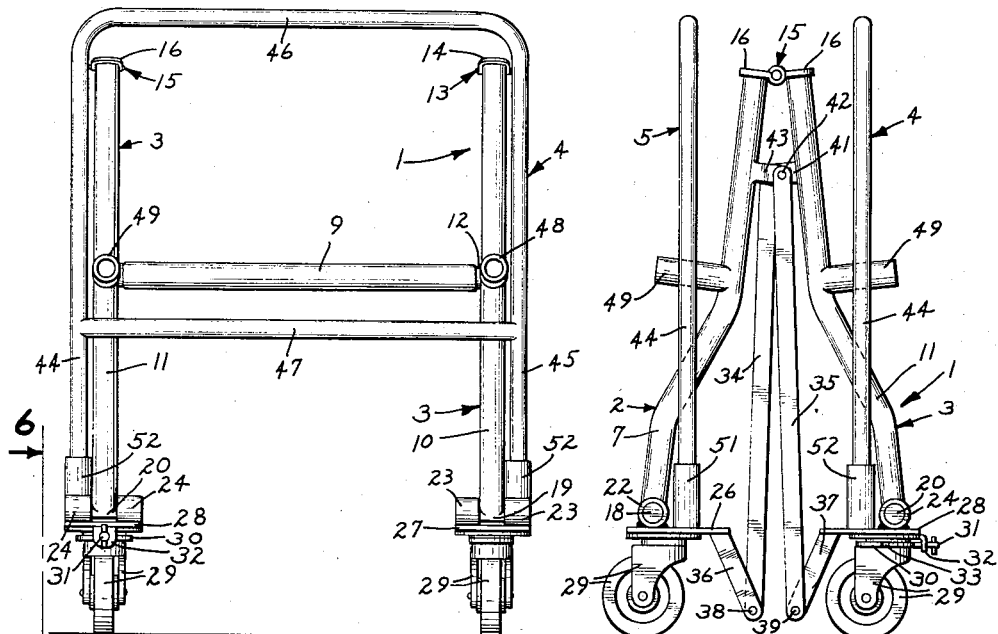
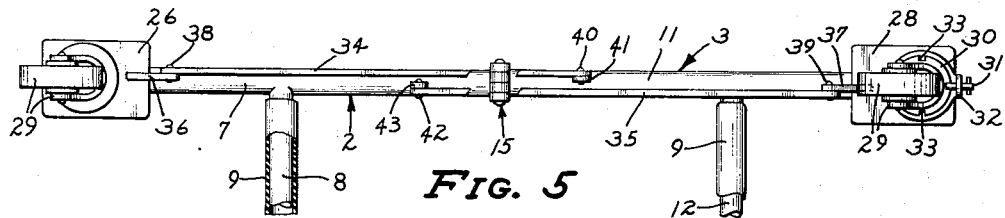
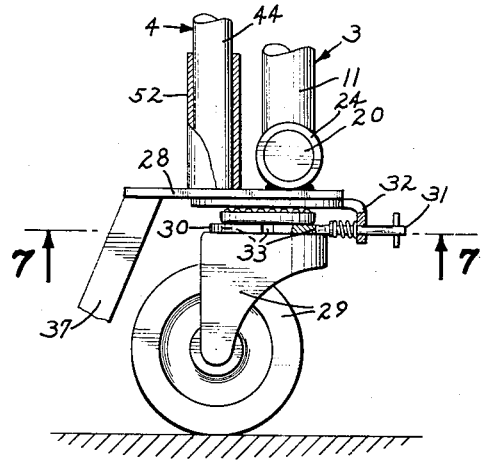
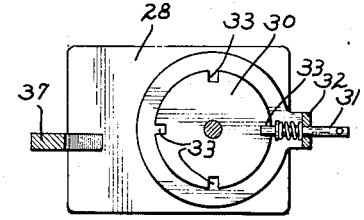
INVENTOR
KERMIT H. WILSON
BY
Merchant & Merchant
ATTORNEYS

United States Patent Office 2,969,245
Patented Jan. 24, 1961

---

2,969,245

DEVICE FOR TRANSPORTING AND STORING ARTICLES OF FURNITURE AND THE LIKE

Kermit H. Wilson, % Sico Manufacturing Co., 5215 Eden Ave. S., Minneapolis, Minn.

Filed Mar. 23, 1959, Ser. No. 801,169

4 Claims. (Cl. 280—41)

My invention relates generally to mobile supports, and more particularly to trucks for transporting and storing articles of furniture and the like, such as folding tables and chairs. An important object of my invention is the provision of a transporting and storing truck which is collapsible or foldable from an extended operative condition to an inoperative folded condition wherein it occupies a minimum of floor space when not in use.

Another object of my invention is the provision of a truck as set forth which can be folded for storage or unfolded for use in a minimum of time and with little effort, without the use of tools.

Another object of my invention is the provision of a transporting and storing truck including, a pair of frame sections hinged together at tneir inner ends for movements between generally horizontal operative positions and generally upright folded positions, supporting wheels on outer end portions of said frame sections, and novel means for maintaining the outer ends of the frame sections in overlying relation to their respective wheels in all relative positions of the frame sections between open and folded relationship. To this end, I provide wheel mounting means pivotally connected to the outer ends of the frame sections, and novel control linkage pivotally connecting the wheel mounting means of one of said frame sections to the opposite frame section, whereby a given wheel mounting means with its respective control linkage and at least a portion of both frame sections define a quadrilateral figure with pivotal connections at the corners thereof.

Another object of my invention is the provision of upright article confining members, and novel means for mounting the same in operative positions at opposite sides of the frame of my device, whereby articles of furniture may be stored on edge between said confining members; and of novel means for supporting said confining members on opposite frame sections when said frame is folded.

Still another object of my invention is the provision of a device as set forth which is simple and inexpensive to produce, which is highly efficient in operation, and which is rugged in construction and durable in use.

The above, and still further highly important objects and advantages of my invention, will become apparent from the following detailed specification, appended claims and attached drawings.

Referring to the drawings, which illustrate the invention, and which like reference characters indicate like parts throughout the several views:

Fig. 3 is a view corresponding to Fig. 1, but showing my device in a collapsed or folded condition;

Fig. 4 is a view in end elevation of my device in its position illustrated in Fig. 3;

Fig. 5 is a fragmentary view in bottom plan of one side portion of the device in its position of Figs. 1 and 2, some parts being broken away and some parts being shown in section;

Fig. 6 is a fragmentary detail in side elevation as seen from the line 6—6 of Fig. 4, on an enlarged scale, some parts being broken away and some parts being shown in section; and Fig. 7 is a view partly in bottom plan and partly in section, taken substantially on the line 7—7 of Fig. 6.

In the preferred embodiment of my invention illustrated, a supporting frame, indicated in its entirety by the numeral 1, is shown as comprising a pair of cooperating frame sections 2 and 3 and article confining members 4 and 5 at opposite sides of the frame sections 2 and 3.

Figure 1:
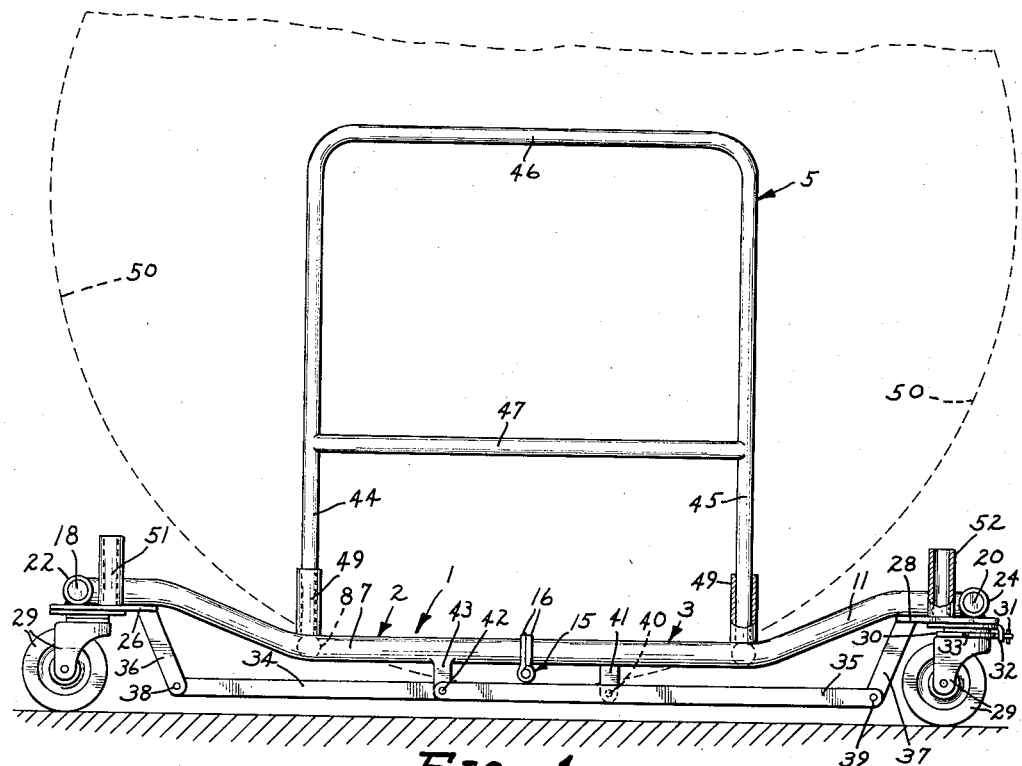
Fig. 1 is a view in side elevation of my device, some parts being broken away and some parts shown in section.

The frame section 2 comprises a pair of laterally spaced generally parallel side rails 6 and 7 that are rigidly connected intermediate their ends by a cross bar 8 welded or otherwise rigidly secured thereto, said cross bar 8 being covered by a tubular protective member 9, preferably made from non-slip and non-marking material, such as rubber or soft synthetic resin. Likewise, the frame section 3 comprises a pair of laterally spaced parallel side rails 10 and 11 and a rigid cross bar 12 welded or otherwise rigidly secured at its opposite ends to the intermediate portions of the side rails 10 and 11. The cross member 12, like the cross member 8 is covered by a second tubular protective and cushioning member 9. Preferably, the side rails 6, 7, 10 and 11, as well as the cross members or bars 8 and 12 are fabricated from rigid steel stock such as tubing or the like. The adjacent inner ends of the side rails 6 and 10 are connected for swinging movements on a horizontal axis extended generally transversely of the frame 1 by means of a hinge 13, the opposite leaves 14 of which are welded or otherwise rigidly secured one each to the inner end of a different one of the side rails 6 and 10. Likewise, the inner ends of the side rails 7 and 11 are pivotally connected for swinging movements coaxially with the hinge 13, by a second hinge 15, the opposite leaves 16 of which are welded or otherwise rigidly secured to the inner ends of the side rails 7 and 11. The hinges 13 and 15 permit swinging movements of the frame sections 2 and 3 from their generally horizontally disposed operative load carrying positions of Figure 1 to their inoperative folded positions of Fig. 3. With reference to Fig. 1, it will be seen that the common axis of the hinges 13 and 15 is downwardly offset from the plane of the side rails so that, when the frame 1 is in its operative position, the leaves 14 and 16 of the hinges 13 and 15 are in abutting relationship, whereby to positively limit downward swinging movement between the frame sections 2 and 3 beyond their normally horizontal load carrying positions.

Welded or otherwise rigidly secured to the outer ends of the side rails 6, 7, 10 and 11 are respective pintle elements 17, 18, 19 and 20. The pintles 17 and 18 are axially aligned, as are the pintles 19 and 20, the common axes of the pintles being parallel to the common axis of the hinges 13 and 15. The pintles 17–20 are journalled in gudgeon portions 21, 22, 23 and 24, said gudgeon portions being mounted respectively on horizontally disposed plate-like wheel mounting members 25, 26, 27 and 28, by welding or the like. The plate-like wheel mounting members 25–28 inclusive are each supported by a different one of a plurality of conventional casters 29 whereby the frame may be moved easily from place to place. One of the casters 29, namely that associated with the mounting member 28, is provided with a locking device including a notched disc 30 rigidly mounted on the caster and an extensible and retractable pin 31 carried by a bracket 32 rigidly secured to the wheel mounting member 28. When the pin is moved into engagement with one of the notches indicated at 33, to lock the associated caster 29 against steering movement, the entire frame 1 is deterred from moving over a floor, so that loading or unloading of articles is facilitated.

For the purpose of maintaining the several casters 29 in an upright condition, wherein the plate-like wheel mounting members 28 are horizontally disposed, at all times and without regard to the folded or unfolded condition of the frame 1, I provide novel means including a pair of rigid control links 34 and 35, the former operatively associated with the wheel mounting member 26, and the latter operatively associated with the wheel mounting member 28. As shown, the links 34 and 35 underlie the side rails 7 and 11 when the frame sections 2 and 3 are in their generally horizontally disposed operative positions. A second pair of control links, not shown, and identical to the control links 34 and 35, may be assumed to be operatively associated with the wheel mounting members 25 and 27 and be disposed in underlying relationship to the adjacent side rails 6 and 10. The wheel mounting members 26 and 28 are provided with depending arms 36 and 37 respectively the outer ends of the control links 34 and 35 being pivotally connected to the lower ends of the arms 36 and 37 respectively, as indicated at 38 and 39 respectively. The inner end of the control link 34 is pivotally connected, as indicated at 40 to a depending ear 41 rigidly connected to the side rail 11 in longitudinally outwardly spaced relation to the hinge 15. In like manner, the inner end of the control link 35 is pivotally connected, as indicated at 42, to a depending ear 43 rigidly secured to the side rail 7 in longitudinally outwardly spaced relation to the hinge 15. The axes of the pivotal connections 38, 39, 40 and 42 are parallel to the axes of the various pivotal connections between the side rails and their respective wheel mounting members, as well as parallel to the aligned axes of the hinges 13 and 15. With this arrangement, the side rails and their respective control links, together with their respective wheel mounting members and depending arms, cooperate to define generally quadrilateral figures having parallel pivot joints at the corners thereof. For example, the side rail 7 and link 34 define opposite sides of a given generally quadrilateral figure, the plate-like wheel mounting member 26 and its respective arm 36 and the ear 41 together with that portion of the side rail 11 between the ear 41 and the hinge 15, forming the ends of said given quadrilateral figure. Thus, when the frame 1 is collapsed or folded from its operative load supporting position of Fig. 1 to its storage position of Fig. 3, and vice-versa, the various plate-like wheel mounting members 25–28 remain in substantially horizontal positions in overlying relation to their respective casters 29.

The confining members 4 and 5 are inverted generally U-shaped, each having spaced depending legs 44 and 45 and a horizontally disposed connecting portion 46. Intermediate their ends, the legs 44 and 45 are connected by a cross rail 47. The lower ends of the legs 44 and 45 of the confining member 4 are adapted to be received in upwardly opening sockets 48 at the intermediate portions of the side rails 7 and 11, the lower ends of the legs 44 and 45 of the confining member 5 being adapted to be received in similar upwardly opening sockets 49 at the intermediate portions of the side rails 7 and 11. With the confining members 4 and 5 thus positioned at opposite sides of the frame 1, and as above indicated, articles of furniture may be supported on edge on the cross members 8 and 12 and held against lateral tilting by the confining members 4 and 5. In Fig. 1, a circular folding table is shown fragmentarily in outline by dotted lines, and indicated at 50. When the instant device is utilized to support circular tables, as shown, each table is cradled between the cross members 8 and 12 so that the tables are prevented from accidentally rolling out of the supporting device. The side rails 6 and 10 with their confining member 4 are spaced apart from the side rails 7 and 11 together with their confining member 5 so that several tables, standing on edge, may be supported therebetween. Moreover, the substantial spacing between the wheel mounting members 25 and 26 as well as that between the opposite wheel mounting members 27 and 28 permits the table 50 to be rolled to and over and adjacent cross member 8 or 12 and into its cradled position between the cross members 8 and 12 with little effort. Although I have shown the device as supporting a circular table, it will be appreciated that rectangular tables may be stored in the device with equal facility, as well as folding chairs or other suitable articles.

Figure 2:
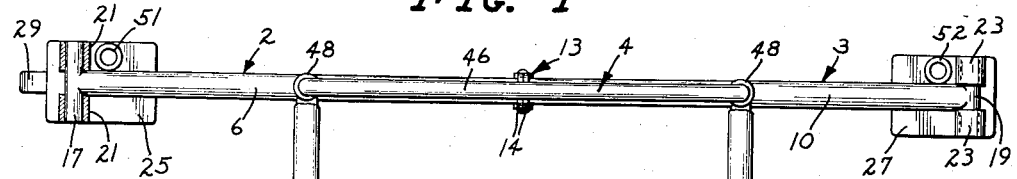
Fig. 2 is a view in top plan of the device of Fig. 1, some parts being broken away and some parts being shown in section.

The rigidity with which the upwardly opening sockets 48 and 49 are secured to their respective side rails, and that of the confining members 4 and 5 aids in bracing the frame sections 2 and 3 when the same are in their open operative positions of Figs. 1 and 2. When it is desired to collapse or fold the frame 1 to its position shown in Figs. 3 and 4, it is necessary that the confining members 4 and 5 be removed from the sockets 47 and 48. In order that these confining members 4 and 5 be be not misplaced, I provide pairs of storage sockets 51 and 52 rigidly mounted on the plate-like mounting members 25–28, the sockets 51 being mounted on the wheel mounting members 25 and 26 and the sockets 52 being rigidly mounted on the wheel mounting members 27 and 28, see Fig. 2. Thus, when the frame sections 2 and 3 are moved to their inoperative folded positions of Figs. 3 and 4, the lower ends of the legs 44 and 45 of the confining members 4 and 5 are received in the sockets 51 and 52, the entire truck occupying a minimum of space. In practice, the frame sections 2 and 3 are moved slightly closer toward each other than indicated in Fig. 3, the pivotal connections 38 and 39 being substantially in overlapping relationship when the device is in its fully folded position. Further, the pintles 17–20 are so closely fitted to their respective gudgeons 21–24 that the frictional contact therebetween is sufficient to hold the truck in its collapsed or folded condition, thus eliminating the necessity for special locking devices.

My invention has been thoroughly tested and found to be completely satisfactory for the accomplishment of the objectives set forth; and, while I have shown and described a commercial embodiment of my novel structure, it will be understood that the same is capable of modification without departure from the spirit and scope of the invention, as defined in the claims.

What I claim is:

1. In a collapsible truck for transporting and storing articles of furniture and the like, a frame comprising a pair of cooperating normally generally horizontally disposed frame sections, hinge means pivotally connecting the inner ends of said frame sections together for swinging movements on a horizontal axis between their normally horizontally disposed operative article supporting positions and inoperative generally upright positions, wheel mounting means pivotally secured to the outer ends of each of said frame sections on horizontal axes parallel to the axis of said hinge means, supporting wheels journalled on said wheel mounting means, portions of said frame sections in their generally horizontal positions being disposed adjacent the level of the tops of said wheels, and means for maintaining each of said mounting means in given positions of pivotal movement relative to each other throughout movement of said frame sections between their operative and inoperative positions, said last-mentioned means comprising a pair of rigid control links disposed at one side of said truck and each pivotally connected to wheel mounting means of a different one of said frame sections and to the opposite frame section, the pivotal connections of said links to the wheel mounting means and to the frame sections having axes parallel to the axis of said hinge means.

2. In a collapsible truck for transporting and storing articles of furniture and the like, a frame comprising a pair of cooperating frame sections, each of said frame sections including a pair of laterally spaced generally parallel side rails and an article supporting cross member rigidly connected to said side rails, hinge means pivotally connecting the inner ends of the side rails of one of said frame sections to the inner ends of the side rails of the other of said sections for swinging movements of said frame sections on a horizontal axis between generally horizontally disposed operative article supporting positions in end to end substantially aligned relationship and inoperative generally upright positions, wheel mounting means pivotally secured to the outer ends of each of said frame sections on parallel horizontal axes parallel to the axis of said hinge means, supporting wheels journalled on said mounting means, the cross member of each of said frame sections in their generally horizontal positions being disposed adjacent the level of the tops of said wheels, and means for maintaining each of said wheel mounting means in given positions of pivotal movement relative to each other throughout movement of said frame sections between their operative and inoperative positions, said last-mentioned means comprising a pair of rigid control links adjacent a hinged pair of said side rails and each pivotally connected to wheel mounting means of a different one of said frame sections and to the opposite frame section, the pivotal connections of said links to the wheel mounting means and to the frame sections having axes parallel to the axis of said hinge means.

3. In a collapsible truck for transporting and storing articles of furniture and the like, a frame comprising a pair of cooperating frame sections, each of said frame sections including a pair of laterally spaced generally parallel side rails and an article supporting cross member rigidly connected to said side rails, hinge means pivotally connecting the inner ends of the side rails of one of said frame sections to the inner ends of the side rails of the other of said sections for swinging movements of said frame sections on a horizontal axis between generally horizontally disposed operative article supporting positions in end to end substantially aligned relationship and inoperative generally upright positions, wheel mounting members pivotally secured to the outer ends of said rails on horizontal axes parallel to the axis of said hinge means, frame supporting wheels journalled on said wheel mounting members, the cross member of each frame section in its generally horizontal position being disposed adjacent the level of the top of said wheels, and means for maintaining each of said wheel mounting members in given positions of pivotal movement relative to each other throughout movement of said frame sections between their operative and inoperative positions, said last-mentioned means comprising pairs of rigid control links, each of said links being pivotally secured at one end to a different one of said wheel mounting members on an axis in spaced parallel relation to the axis of the pivotal connection of its respective wheel mounting member to the side rail associated therewith, the opposite end of each of said links being pivotally connected to the opposite one of said side rails at the adjacent side of said frame on an axis in spaced parallel relation to the axis of said hinge means.

4. In a collapsible truck for transporting and storing articles of furniture and the like, a frame comprising a pair of cooperating frame sections, each of said frame sections including a pair of laterally spaced generally parallel side rails and an article supporting cross member rigidly connected to said side rails, hinge means pivotally connecting the inner ends of the side rails of one of said frame sections to the inner ends of the side rails of the other of said sections for swinging movements of said frame sections on a horizontal axis between generally horizontally disposed operative article supporting positions in end to end substantially aligned relationship and inoperative generally upright positions, wheel mounting means pivotally secured to the outer ends of each of said frame sections on parallel horizontal axes parallel to the axis of said hinge means, supporting wheels journalled on said mounting means, the cross member of each of said frame sections in their generally horizontal positions being disposed adjacent the level of the tops of said wheels, a pair of upright article confining members having depending legs at their opposite end portions, upwardly opening socket elements on each of said side rails for reception of said legs to mount said confining members in laterally spaced parallel article supporting relationship at opposite sides of said frame, and means for maintaining each of said wheel mounting means in given positions of pivotal movement relative to each other throughout movement of said frame sections between their operative and inoperative positions, said last-mentioned means comprising a pair of rigid control links at one side of said frame sections and each pivotally connected to wheel mounting means of a different one of said frame sections and to the opposite frame section, the pivotal connections of said links to the wheel mounting means and to the frame sections having axes parallel to the axis of said hinge means.

References Cited in the file of this patent

UNITED STATES PATENTS

| 637,650 | Northrop | Nov. 21, 1899 |
| 801,051 | Smith | Oct. 3, 1905 |
| 1,849,028 | Robinson | Mar. 8, 1932 |
| 2,251,567 | Gould | Aug. 5, 1941 |
| 2,730,418 | Blink | Jan. 10, 1956 |
| 2,754,127 | Owens | July 10, 1956 |

FOREIGN PATENTS

| 145,562 | Austria | May 11, 1936 |